United States Patent
Li et al.

(10) Patent No.: US 8,769,189 B2
(45) Date of Patent: Jul. 1, 2014

(54) METHOD AND APPARATUS FOR BYTE-ACCESS IN BLOCK-BASED FLASH MEMORY

(75) Inventors: Hsiang-Pang Li, Hsinchu (TW); Chung-Jae Doong, Hsinchu (TW); Cheng-Yuan Wang, Taipei (TW)

(73) Assignee: Macronix International Co., Ltd., Hsinchu (TW)

( * ) Notice: Subject to any disclaimer, the term of this patent is extended or adjusted under 35 U.S.C. 154(b) by 324 days.

(21) Appl. No.: 12/768,368

(22) Filed: Apr. 27, 2010

(65) Prior Publication Data

US 2010/0293320 A1    Nov. 18, 2010

Related U.S. Application Data

(60) Provisional application No. 61/178,813, filed on May 15, 2009.

(51) Int. Cl.
  *G06F 12/02* (2006.01)
(52) U.S. Cl.
  CPC .... *G06F 12/0246* (2013.01); *G06F 2212/7202* (2013.01); *G06F 2212/7207* (2013.01)
  USPC .......................... 711/103; 711/154; 711/165
(58) Field of Classification Search
  CPC .................. G06F 12/0246; G06F 2212/7202; G06F 2212/7207
  USPC .......................... 711/103, 154, 165
  See application file for complete search history.

(56) References Cited

U.S. PATENT DOCUMENTS

| | | | |
|---|---|---|---|
| 5,341,339 A | 8/1994 | Wells | |
| 5,404,485 A | 4/1995 | Ban | |
| 5,485,595 A | 1/1996 | Assar et al. | |
| 5,845,313 A | 12/1998 | Estakhri et al. | |
| 5,937,425 A * | 8/1999 | Ban | 711/103 |
| 6,000,006 A | 12/1999 | Bruce et al. | |
| 6,115,313 A * | 9/2000 | Pio | 365/228 |
| 6,115,785 A | 9/2000 | Estakhri et al. | |
| 6,223,308 B1 * | 4/2001 | Estakhri et al. | 714/42 |
| 6,587,915 B1 | 7/2003 | Kim | |
| 6,938,116 B2 * | 8/2005 | Kim et al. | 711/103 |
| 7,318,151 B1 * | 1/2008 | Harris | 713/2 |
| 7,480,761 B2 * | 1/2009 | Birrell et al. | 711/103 |
| 7,620,769 B2 * | 11/2009 | Lee et al. | 711/103 |
| 8,095,723 B2 * | 1/2012 | Kim et al. | 711/103 |

(Continued)

OTHER PUBLICATIONS

Condit et al., "Better I/O Through Byte-Addressable, Persistent Memory", SOSP'09, Oct. 2009, ftp://ftp.cs.utexas.edu/pub/dburger/papers/SOSP09.pdf.*

(Continued)

*Primary Examiner* — Sanjiv Shah
*Assistant Examiner* — Samuel Dillon
(74) *Attorney, Agent, or Firm* — Kenta Suzue; Haynes Beffel & Wolfeld LLP

(57) ABSTRACT

Techniques are described herein for managing data in a block-based flash memory device which avoid the need to perform sector erase operations each time data stored in the flash memory device is updated. As a result, a large number of write operations can be performed before a sector erase operation is needed. In addition, the block-based flash memory can emulate both programming and erasing on a byte-by-byte basis, like that provided by an EEPROM.

18 Claims, 11 Drawing Sheets

(56) References Cited

U.S. PATENT DOCUMENTS

| | | | |
|---|---|---|---|
| 8,347,050 B2* | 1/2013 | Bernstein et al. | 711/162 |
| 8,386,696 B2* | 2/2013 | Kim et al. | 711/103 |
| 2006/0002197 A1* | 1/2006 | Rudelic | 365/189.09 |
| 2007/0143531 A1* | 6/2007 | Atri | 711/103 |
| 2009/0287874 A1* | 11/2009 | Rogers et al. | 711/103 |
| 2010/0287330 A1* | 11/2010 | Su et al. | 711/103 |

OTHER PUBLICATIONS

Sang-Won Lee et al., "Accelerating In-Page Logging with Non-Volatile Memory", Bulletin of the IEEE Computer Society Technical Committee on Data Engineering, vol. 33, No. 4. (2010), http://www.cs.arizona.edu/~bkmoon/papers/debul110-aipl.pdf.*

Sang-Won Lee et al., "Design of Flash-Based DBMS: An In-Page Logging Approach", SIGMOD'07, Jun. 12-14, 2007, https://cs.arizona.edu/~bkmoon/papers/sigmod07.pdf.*

Sang-Won Lee et al., "A Log Buffer-Based Flash Translation Layer Using Fully-Associative Sector Translation", ACM Transactions on Embedded Computing Systems, Jul. 2007, vol. 6, No. 3, Article 18.*

"Application Note: Virtual EEPROM", Renesas, Mar. 2005, pp. 1-8.

"Applicaiton Note: Understanding the Flash Translation Layer (FTL) Specification", AP-684, Intel, Dec. 1998, pp. 1-20.

"32K SPI Bus Serial EEPROM", 25AA320A/25LC320A, Microchip Technology, Inc., 2008, pp. 1-30.

* cited by examiner

700

Read command to read data for a particular logical address

↓

Determine the block corresponding to the particular logical address — 710

↓

Read the status flags of the sectors of the corresponding block to determine the active (working) sector — 720

↓

Search the write log data in the write-log area of the active sector for an entry of the particular logical address — 730

↓

Find an entry of the particular logical address?

— No → Read and output the data from the corresponding entry in the core data area — 750

— Yes ↓

Read the updated data for the particular logical address using the entry — 740

Fig. 7

METHOD AND APPARATUS FOR BYTE-ACCESS IN BLOCK-BASED FLASH MEMORY

CROSS-REFERENCE TO RELATED APPLICATIONS

This application claims the benefit of U.S. Provisional Application No. 61/178,813 titled "Intelligent and Reliable Algorithm to Perform Byte-Access in Block-Based Flash Memory" filed 15 May 2009, which is incorporated by reference herein.

BACKGROUND OF THE INVENTION

1. Field of the Invention

The present invention relates to flash memory technology, and more particularly to techniques for managing data in block-based flash memory devices.

2. Description of Related Art

Electrically Erasable Programmable Read-Only Memory (EEPROM) and flash memory include memory cells that store charge between the channel and gate of a field effect transistor. The charge stored affects the threshold voltage of the transistor, and the changes in threshold voltage due to the stored charge can be sensed to indicate data stored in the memory cell. One type of charge storage cell is known as a floating gate memory cell, which stores charge on an electrically conductive layer between the channel and gate. Another type of charge storage cell is referred to as a charge trapping memory cell, which uses a dielectric layer in place of the floating gate.

The term "program" as used herein refers to an operation which increases the threshold voltage of the transistor. The term erase as used herein refers to an operation which decreases the threshold voltage of the transistor. Further, the term "write" as used herein describes an operation which changes the threshold voltage of the transistor, and is intended to encompass the operations for increasing and for decreasing the threshold voltage of the transistor.

In an EEPROM device the memory cells can be both programmed and erased on a byte-by-byte basis, independent of the other data bytes. However, to enable the programming and erasing on a byte-by-byte basis, the memory density of EEPROM is relatively low.

Flash memory typically provides higher memory density than EEPROM. In a flash memory device the memory cells can be programmed on a byte-by-byte basis. However, because of the configuration of the flash memory cells, erasing is performed on a much larger sector-by-sector basis, where each sector includes a relatively large number of bytes. Therefore, in order to erase a memory cell in a sector, all the memory cells in that sector must also be erased. In other words, flash memory offers programming on a byte-by-byte basis, but does not offer erasing on a byte-by-byte basis as is provided by EEPROM.

EEPROM and flash memory devices are often used for different applications. Generally, because of its higher density, flash memory is more economical than EEPROM in mass data storage applications. EEPROM is commonly used in applications where programming and erasing small amounts of data on a byte-by-byte basis is desired.

A variety of electronic devices also include both EEPROM and flash memory, in order to fulfill the different memory performance requirements for the various functions of the device. However, using both of these types of memory increases the cost and complexity of the device.

Because flash memory does not offer erase on a byte-by-byte basis, writing updated data to a sector can be done by performing a sector erase operation to erase all the memory cells in that sector, and then writing the updated data into that sector. A drawback to this process is that all the memory cells in that sector experience a cycle count, even though data may only be changed in some of the memory cells in that sector. This process is also slow.

A specific issue arising in flash memory is limited endurance, the number of erase and/or program cycles over which the cells in the device remain operative and reliable. Thus repeated and frequent writes to a single sector, or a small number of sectors, will result in some of the sectors becoming defective in a relatively short time.

Various "wear-leveling" techniques have been proposed for extending the lifetime of flash memory. One wear-leveling approach involves the use of counters to track the number of times each sector is erased. The counters are then used to alter the mapping of data into the various sectors, to even out their wear. See, for example, U.S. Pat. Nos. 6,000,006; 5,485,595; and 5,341,339.

Although the use of counters can extend the lifetime of flash memory devices, the problem of limited read/write endurance continues to preclude the use of flash memory in applications requiring a large number of program and erase operations.

Another wear-leveling approach is to write updated data to an unused physical location in the flash memory device, rather than overwriting old data in the original location. This reduces the number of sector erase operations for a given number of write operations to the flash memory device. See, for example, U.S. Pat. Nos. 5,845,313; and 6,115,785.

In order to track the changes in the physical locations of the data, a programmable mapping or address translation table can be used. The programmable mapping table stores mapping information between the logical addresses specified by an external system and the actual physical addresses of the flash device containing valid data. In order to accurately track the physical locations of valid data, the programmable mapping table is updated during operation.

To ensure that valid data is preserved, the mapping information must be preserved when power is no longer being supplied. However, since the programmable address translation is continuously being updated, storing the mapping information in the flash memory reduces the life of the device. This can also significantly impact the performance of a system utilizing flash memory, due to the relatively slow erase cycle of the flash memory. The programmable mapping table may alternatively be stored in another non-volatile memory circuit on the flash device. However, this increases the cost and complexity of the flash device.

It is therefore desirable to provide flash memory devices which emulate programming and erasing on a byte-by-byte basis as provided by EEPROM, while also addressing the issue of endurance with reduced complexity and cost.

SUMMARY OF THE INVENTION

Techniques are described herein for managing data in a flash memory device which avoid the need to perform sector erase operations each time data stored in the flash memory device are updated. Logical addresses mapped to the blocks in the flash memory device have a smaller number of addresses than the blocks. The sector erase operations are avoided by writing the updated data for the logical addresses to empty pre-erased locations in the corresponding blocks, rather than directly overwriting old data. As a result, a large number of write operations can be performed before a sector erase operation is needed. In addition, the block-based flash memory can emulate both programming and erasing on a byte-by-byte basis, as provided by an EEPROM.

A method is described herein for operating a flash memory device having a plurality of blocks, where each block in the plurality of blocks comprises a plurality of sectors. The method includes mapping logical addresses to corresponding blocks in the plurality of blocks.

For a particular block in the plurality of blocks, the method also includes marking a first sector of the particular block as an active sector having a core data area and a write-log area. The core data area is used to store a data set for the corresponding logical addresses, and the write-log area is used to store updates of the data in the data set. A second sector of the particular block is marked as an inactive sector. The inactive sector serves as a transfer unit to store an updated data set for the corresponding group of logical addresses. The data set is then written to the core data area.

In response to a write command to write update data for a logical address mapped to the particular block, write-log data is written to a free location in the write-log area. The write-log data indicates the logical address, and indicates the updated data.

The data from the core data area and the write-log area is also used to compose an updated data set from time to time, such as when the write-log area is full, so that the write-log area does not overflow. The updated data set is written within a core data area of the second sector, and marked as the active sector for the particular block. The first sector is erased and marked as the inactive sector for the particular block.

The first and second sectors can each include a status flag area, where marking the second sector as the active sector comprises programming predetermined data in the status flag area of the second sector, and marking the first sector as the inactive sector comprises erasing the status flag area of the first sector.

The marking of the sectors can be accomplished by changing data in the status flag area, without the need to always erase the status flag area. For example, when a sector is inactive, the data in the status flag area can be all "1's" in binary notation, or all "F's" in hexadecimal notation. Thereafter, the data in the status flag area can be changed by programming predetermined data in the status flag area so that particular bits that are a logical state '1' (erased) are changed to a logical state '0' (programmed), while leaving the bits that are already at logical state '0'. For example, if the data of the status flag area for an inactive sector is "0xFFFFFF", successive programming to the status flag area during operation change the data value to "0xFFFF00", then to "0xFF0000", and then to "0x000000". Since the status flag area is within the sector, the status flag area is then erased back to "0xFFFFFF" when the sector is erased. This technique eliminates the need to erase the status flag area each time the data of the status flag area needs to be changed.

Techniques described herein also efficiently manage the mapping between logical addresses and the physical addresses of the blocks which contain valid data, without the need for frequent updates to the logical-to-physical address mapping information.

Mapping techniques described herein identify the block corresponding to a particular logical address, and identify an offset indicating a relative physical address in the core data area. In the case where the write-log area does not include updated data for the particular logical address, the active sector offset, when used in connection with the marking of the active sector, indicates the corresponding entry in the core data area storing valid data for the logical address. The use of the mapping techniques, status flags and the write-log area obviates the need to update the mapping information each time data in the flash memory device is updated. Thus, instead of having to read and update large mapping tables during operation, the mapping information can remain static.

Also described is an apparatus including a data processor and memory coupled to the data processor. The memory stores instructions executable by the data processor, including instructions for carrying out the various operations described herein on a flash memory array.

Other aspects and advantages of the present invention can be seen on review of the drawings, the detailed description, and the claims which follow.

BRIEF DESCRIPTION OF THE DRAWINGS

FIG. 7 is a flow chart of a read operation to read data for a particular logical address.

DETAILED DESCRIPTION

A detailed description of embodiments of the present invention is provided with reference to the FIGS. 1-12.

Figure 1:
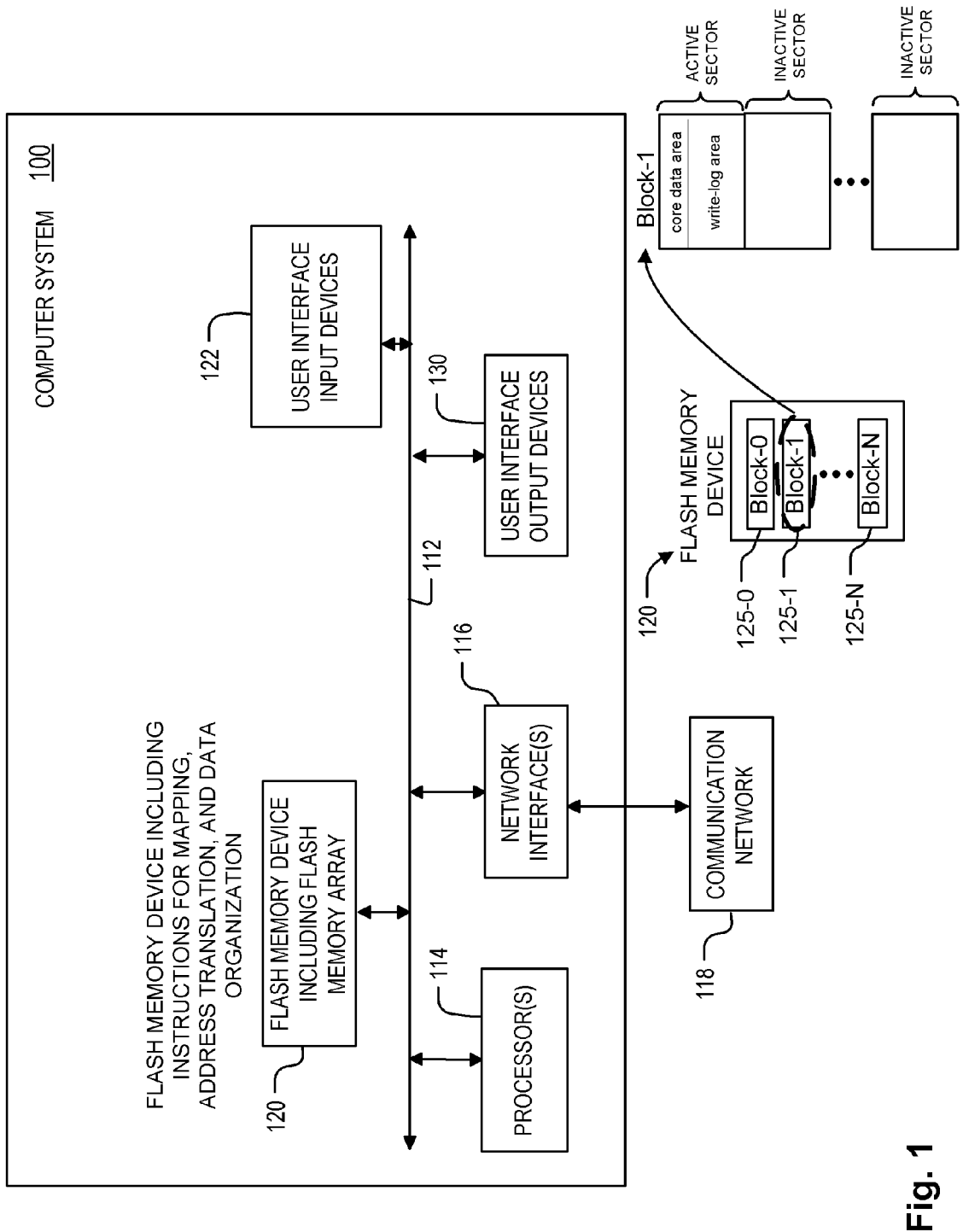
FIG. 1 is a simplified block diagram of a computer system suitable for organizing data in a block-based flash memory device using the techniques described herein.

FIG. 1 is a simplified block diagram of a computer system 100 suitable for organizing data in a block-based flash memory device 120 using the techniques described herein. Computer system 100 typically includes at least one processor 114 which communicates with a number of peripheral devices via bus subsystem 112. These peripheral devices may include the flash memory device 120, user interface input devices 122, user interface output devices 130, and a network interface subsystem 116. The input and output devices allow user interaction with computer system 100. Network interface subsystem 116 provides an interface to outside networks, including an interface to communication network 118, and is coupled via communication network 118 to corresponding interface devices in other computer systems. Communication network 118 may comprise many interconnected computer systems and communication links. These communication links may be wireline links, optical links, wireless links, or any other mechanism for communication of information. While in one embodiment communication network 118 is the Internet, in other embodiments communication network 118 may be any suitable computer network.

User interface input devices 122 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to accommodate all possible types of devices and ways to input information into computer system 100 or onto communication network 118.

User interface output devices 130 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 100 to the user or to another machine or computer system.

Flash memory device 120 stores the basic programming and data constructs that provide the functionality of certain embodiments described herein, including the instructions for logical-to-physical address mapping and translation, and instructions used for organization of data within flash memory device 120 (discussed below). These software modules are generally executed by processor 114, which may include random access memory (RAM) for storage of instructions and data during program execution.

In the illustrated embodiment, the processor 114 executing instructions to carry the various operations described herein is external to the flash memory device 120. Alternatively, the flash memory device 120 includes a processor or other type of controller to control the management of data and carry out the various operations described herein. For example, the controller can be a state machine implemented using special-purpose logic circuitry as known in the art. In alternative embodiments, the controller comprises a general-purpose processor, which may be implemented on the same integrated circuit, which executes a computer program to control the operations of the flash memory device 120. In yet other embodiments, a combination of special-purpose logic circuitry and a general-purpose processor may be utilized for implementation of the controller.

Bus subsystem 112 provides a mechanism for letting the various components and subsystems of computer system 100 communicate with each other as intended. Although bus subsystem 112 is shown schematically as a single bus, alternative embodiments of the bus subsystem 112 may use multiple buses. In some embodiments, the data, address and command signals between the flash memory device 120 and the bus subsystem 112 are applied on shared lines in a serial fashion, such as can be implemented using serial peripheral interfaces as known in the art.

Computer system 100 itself can be of varying types including a personal computer, a portable computer, a workstation, a computer terminal, a network computer, a mainframe, or any other data processing system or user device. Due to the ever-changing nature of computers and networks, the description of computer system 100 depicted in FIG. 1 is intended only as a specific example for purposes of illustrating the preferred embodiments. Many other configurations of computer system 100 are possible having more or less components than the computer system depicted in FIG. 1.

As illustrated in FIG. 1, the flash memory device 120 includes a plurality of physical blocks, including Block-0 125-0 through Block-N 125-N, for storing data organized using the techniques described herein. As noted above, the flash memory device 120 also includes additional blocks for storing the instructions for logical-to-physical address mapping and translation, and the organization of the data in the blocks Block-0 125-0 through Block-N 125-N.

The instructions include the mapping between the logical addresses specified by the computer system 100 to the flash memory device 120, and the physical addresses of the blocks Block-0 125-0 through Block-N 125-N of the flash memory device 120. As described in more detail below, the logical addresses mapped to the blocks Block-0 125-0 through Block-N 125-N have a smaller number of addresses than the number of addresses in the corresponding blocks Block-0 125-0 through Block-N 125-N, so that updated data can be stored in the blocks Block-0 125-0 through Block-N 125-N without the need to perform a sector erase operation.

The blocks Block-0 125-0 through Block-N 125-N each include a plurality of sectors which are separately erasable from the other sectors. The sectors of the blocks Block-0 125-0 through Block-N 125-N include a status flag area storing data which indicates whether a given sector is currently active (working), inactive (erased), dirty, or temporary.

The active sector of a given block is used to store the data for the corresponding logical addresses. The active sector includes a core data area storing a data set for the corresponding group of logical addresses. To enable storage of the updates to the data in the data set, the active sector also includes a write-log area. In a write operation, write-log data including updated data is written into free (empty) locations in the write-log area. The size of the write-log area is a trade-off between how often sector erase operations will be performed and the speed of the read operation (discussed below), and thus can vary from embodiment to embodiment.

As discussed in more detail below, the write-log data in the write-log area is stored in an organized manner, so that the valid data can be correctly determined.

Each block also includes a plurality of inactive sectors that serve as transfer units to store updated data sets for the corresponding logical addresses from time to time, such as when the write-log area is full, so that the write-log area does not overflow.

Block-1 125-1 is representative of the blocks Block-0 125-0 through Block-N 125-N in the flash memory device 120. Block-1 125-1 includes several sectors including 128a-1, 128b-1, and 128c-1 that are separately erasable. In this example, sector 128a-1 is currently the active sector, and sectors 128b-1 and 128c-1 are currently the inactive sectors.

Figure 2:
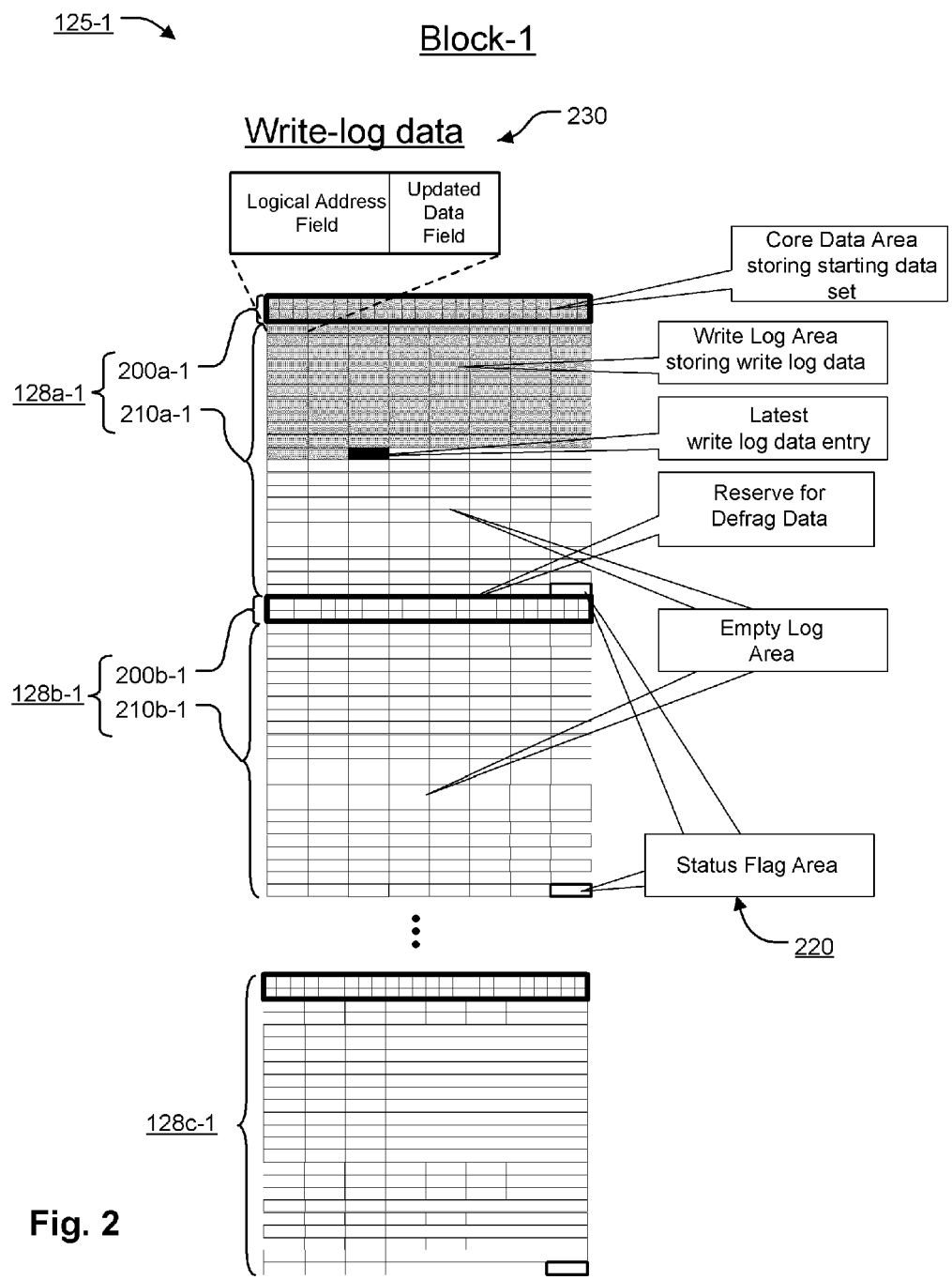
FIG. 2 further illustrates the arrangement of data within an example block.

FIG. 2 further illustrates the arrangement of data within Block-1 125-1. The current active sector, sector 128a-1, includes a core data area 200a-1 which stores the data set for the corresponding logical addresses. At the time it is written, the data set in the core data area 200a-1 is the data for the corresponding logical addresses. Thus, there is a one-to-one correspondence between a logical address and a corresponding entry of data in the core data area 200a-1. Consequently, the number of addresses in the core data area 200a-1 is at least as large as the number of logical addresses mapped to the Block-1 125-1.

The active sector 128a-1 also includes a pre-erased write-log area 210a-1. In response to a write command to update data for a particular logical address mapped to Block-1 125-1, an entry of write-log data 230 is written to an empty pre-erased location in the write-log area 210a-1.

The write-log data 230 includes a first field ("logical address field") indicating the particular logical address for the updated data. The write-log data 230 also includes a second field ("updated data field") indicating the updated data.

The first field of the write-log data 230 indicates that the entry in the core data area 200a-1 corresponding to the particular logical address is no longer valid, and has been replaced by the updated data of the second field of the write-log data 230.

The data in the first field may, for example, be the particular logical address, the physical address in the core data area 200a-1 of the entry corresponding to the particular logical address, the active sector offset (discussed below), or any other data that can be used to determine the particular logical address.

In a write operation, an entry of the write-log data 230 is written to the first empty location in the write-log area 210a-1, with remaining empty locations within the write-log area 210a-1 following the most recent entry of write-log data. In alternative embodiments, an entry of the write-log data 230 is written to the last empty location in the write-log area 210a-1, with remaining empty locations within the write-log area 210a-1 preceding the most recent entry of write-log data. Consequently, the entries of the write-log data are arranged sequentially in a temporal fashion.

By writing the updated data to the write-log area 210a-1, rather than directly overwriting data in the core data area 200a-1 by sector erasing the sector 128a-1, only the memory cells storing the write-log data 230 have been written to. In addition, the updated data was written without performing a sector erase operation. This results in a small number of sector erase operations compared to the number of write operations, which effectively increases the endurance of the flash memory device 120.

Since the write-log data is written to empty locations in the write-log area 210a-1, eventually the write-log area of the sector 128a-1 will become full. Thus, from time to time an updated data set is composed using data from the core data area and the write-log area, and the sectors acting as the active and inactive sectors are switched, so that the write-log area does not overflow. The term "from time to time" as used herein is intended to be construed generally to mean occasionally, and is therefore not restricted to uniform, cyclic, or otherwise equal time intervals.

In the composing process discussed below, the updated data set containing the valid data for the corresponding logical addresses is composed using the data from the core data area 200a-1 and write-log area 210a-1 of the current active sector 128a-1. The updated data set is then written to the core data area 200b-1 of sector 128b-1, and the status flag in the status flag area 220 of sector 128b-1 is changed to indicate that sector 128b-1 is now the active sector. Sector 128a-1 is then erased and set as an inactive sector for the Block-1 125-1. In subsequent write operations to the Block-1 125-1, the write-log data is written to the write-log area 210b-1 of sector 128b-1.

In addition to using the status flag areas 220 to identify the active and inactive sectors of the sectors 128a-1, 128b-1, 128c-1 of the Block-1 125-1, the status flag areas 220 are also used to ensure that the updated data is composed and properly stored in the new active sector. This is discussed in more detail below with respect to FIG. 8.

Figure 3:
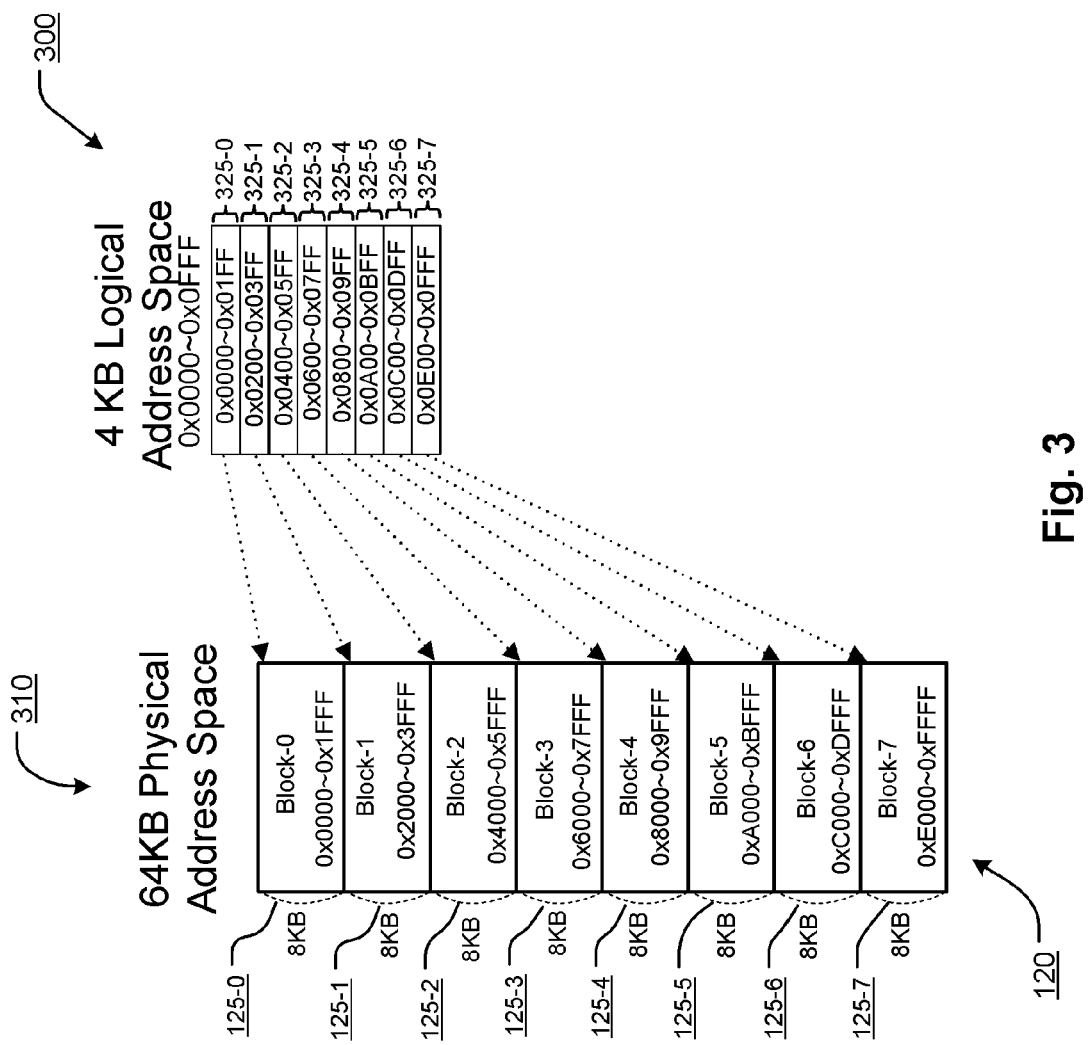
FIG. 3 illustrates an example of mapping between the logical addresses in the logical address space and blocks in the array.

FIG. 3 illustrates an example of mapping between groups 325-0 through 325-7 of logical addresses in the logical address space 300 and blocks Block-0 125-0 through Block-7 125-7 in the physical address space 310 of the flash memory device 120. In this example, 4K bytes of logical address space 300, consisting of logical addresses 0x0000~0x0FFF, are grouped into 8 512 byte groups 325-0 through 325-7. The groups 325-0 through 325-7 of logical addresses are mapped to corresponding 8 K byte blocks Block-0 125-0 through Block-7 125-7, consisting of physical addresses 0x0000~0xFFFF in the flash memory device 120.

Thus, group 325-0 of logical addresses 0x0000~0x01FF is mapped to Block-0 125-0, groups 325-1 of logical addresses 0x0200~0x03FF is mapped to Block-1 125-1, and so on.

In this example each of the 8 K byte blocks includes two 4 K byte sectors. The active sector of each block Block-0 125-0 through Block-7 125-7 includes a 512 byte core data area used to store the data set for the corresponding 512 byte logical address group 325-0 through 325-7. The status_flag area of each sector is 3 bytes. The remaining 35814 bytes of the active sector are used for the write-log area. In this example, 2 bytes are used for the first field ("logical address field") of an entry of write-log data to indicate the particular logical address of the updated data, and 1 byte is used for the second field ("updated data field") of the entry of write-log data to indicate the updated data. Thus, in this example, the write-log area can support 1193 single byte data write operations before the active sector becomes full.

As mentioned above, the active sector of a given block will change during operation. Accordingly, the physical addresses of valid data in the blocks depends upon which sector is currently active, as well as any updated data in the write-log area. As a result, the translation between the logical addresses and the physical addresses which contain valid data is not fixed during operation.

Figure 4:
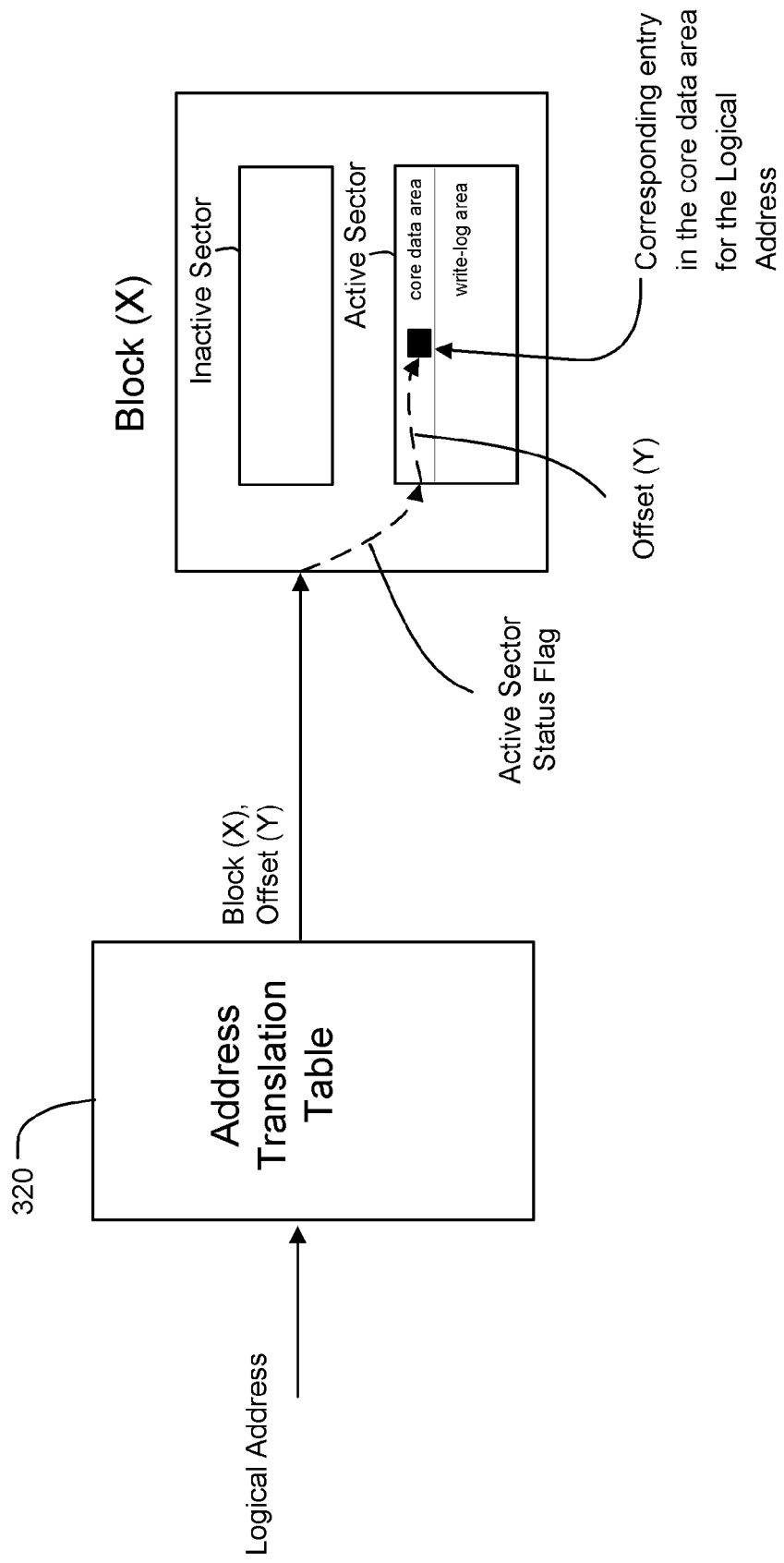
FIG. 4 is an illustration of the translation between the logical address space and the physical address space.

FIG. 4 is an illustration of the translation between the logical address space and the physical address space.

The logical addresses are mapped to the corresponding blocks using an address translation table 320. For a particular logical address, the address translation table 320 provides the block which corresponds to the logical address. The address translation table 320 also provides an active sector offset that identifies a relative address in the core data area associated with the particular logical address.

In the illustrated embodiment the active sector offset is a relative address from the beginning physical address of the core data area. In one such example in which a 512 byte core data area is used to store the data set for a corresponding 512 byte logical address group, the active sector offset is a data value between 0x0000 to 0x01FF.

The active sector offset, when used in connection with the status flags identifying the active sector, indicates the corresponding entry in the core data area associated with the logical address. It should be noted that the corresponding entry in the core data area does not necessarily contain valid data for the logical address, as updated data may be within the write-log area. The read operation for determining the location of valid data is explained below with respect to FIG. 7.

The use of the status flags, offset, and the write-log area obviates the need to update the address translation table 320 each time data in the flash memory device 120 is updated, or when an active sector in a block is changed. Thus, the address translation table 320 can remain static, while also enabling accurate tracking of the valid data.

Since the address translation table 320 need not be continuously updated, it may be stored in the flash memory device 120. During operating the address translation table 320 may also be loaded into higher access speed memory, such as DRAM or SRAM within the processor 114 of FIG. 1.

Figure 5:
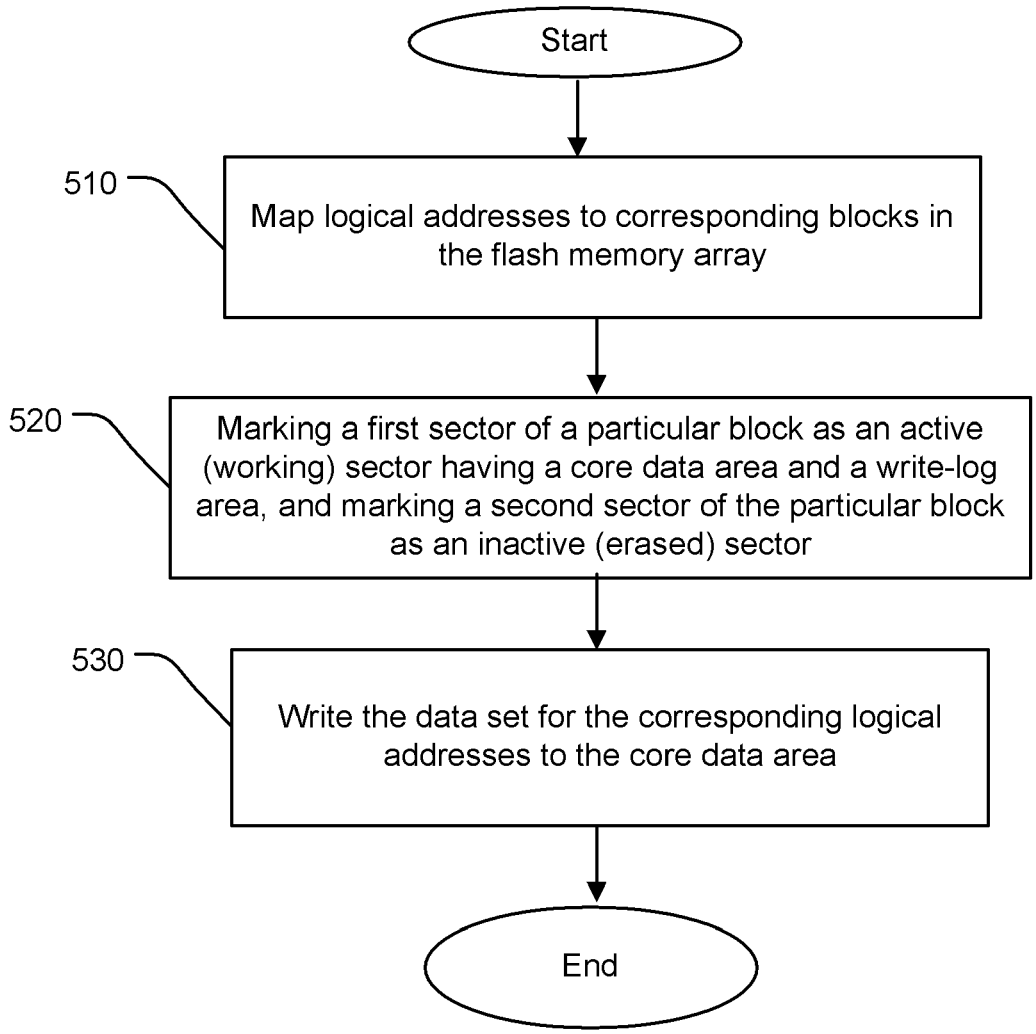
FIG. 5 is a flowchart of an embodiment of a configuration process to store the data set in a particular block in the flash memory array.

FIG. 5 is a flowchart of an embodiment of a configuration process 500 which can be executed by the processor 114 to store the data set in a particular block in the flash memory device 120. As with all flowcharts herein, it will be appreciated that many of the steps can be combined, performed in parallel or performed in a different sequence without affecting the functions achieved. In some cases a re-arrangement of steps will achieve the same result only if certain other changes are made as well, and in other cases a re-arrangement of steps will achieve the same results only if certain conditions are satisfied. Such re-arrangement possibilities will be apparent to the reader.

At step 510 the logical addresses are mapped to corresponding blocks in the flash memory device 120. The mapping can be carried out by creating and storing the address translation table 320 discussed above with reference to FIG. 4.

At step 520, a first sector of the particular block is marked as the active sector by programming the status flag area of the first sector to set its status flag to active. The active sector has a core data area and a write-log area. A second sector in the particular block is marked as the inactive sector by setting its status flag to inactive. In this example a 0xFF0000 status flag indicates the active sector, and a 0xFFFFFF status flag indicates the erased sector.

At step 530 the data set for the corresponding logical addresses is written to the core data area.

Figure 6:
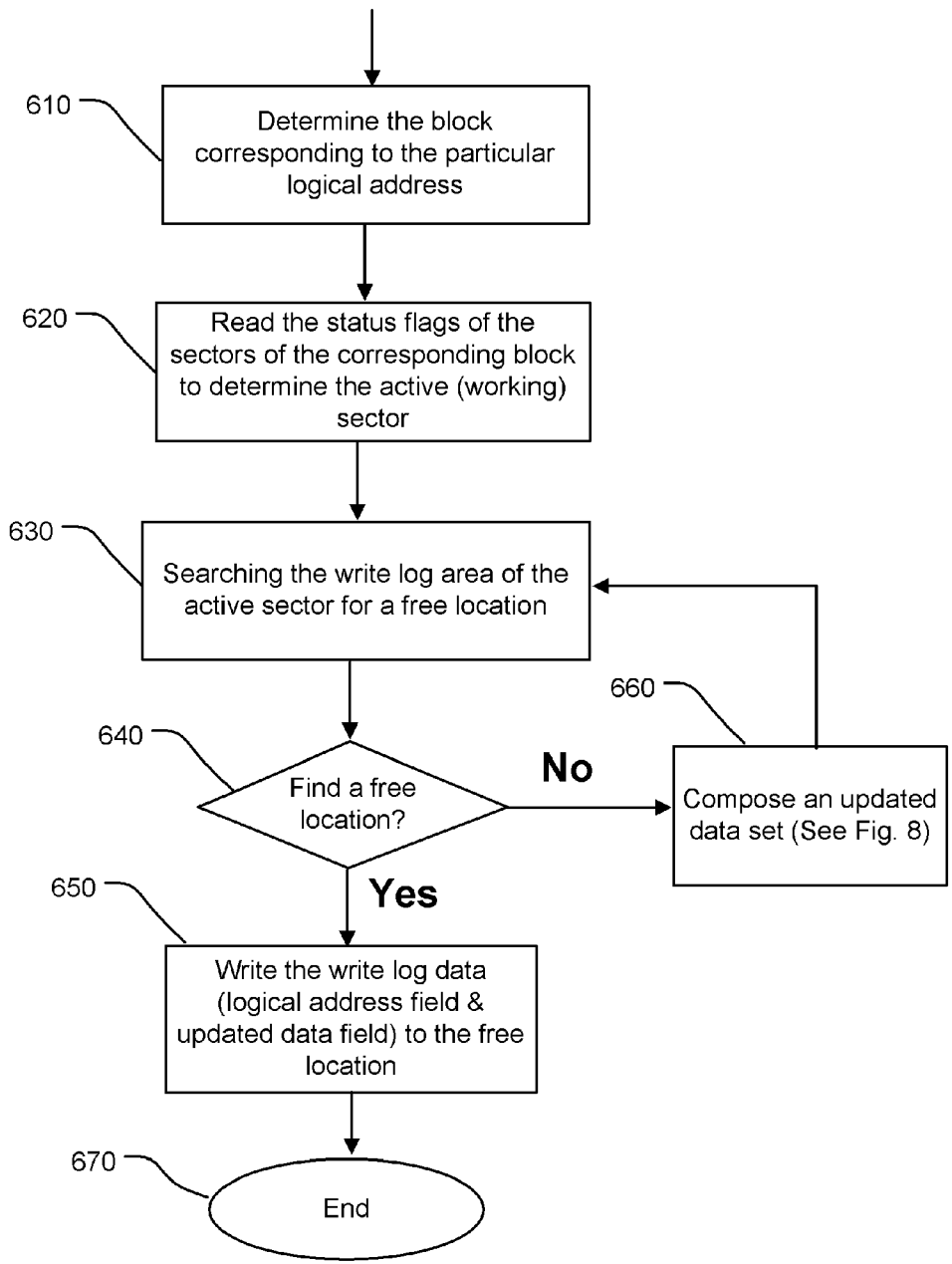
FIG. 6 is a flow chart of a write operation to store updated data for a particular logical address.

FIG. 6 is a flow chart of a write operation 600 which can be executed by the processor 114 to store updated data for a particular logical address.

In response to a write command to store the updated data, at step 610 the block which corresponds to the particular logical address is determined using the address translation table discussed above.

At step 620, the status flag areas of the sectors of the corresponding block are read to find the active sector.

At step 630, the write-log area of the active sector is searched to find a free location. Since empty locations in the write-log area are in an erased state, in this example the logical address fields are read from a beginning of the write-log area to find the first instance of an erased location.

At step 640, if a free location is not found in the write-log area the write-log area of the active sector is full, and the operation continues to block 660 where an updated data set is composed. The composing operation is discussed below with reference to FIG. 8.

If a free location is found in the write-log area, the process continues to step 650. At step 650, a write-log data entry indicating the logical address and the updated data is written to the free location in the write-log area. The write operation 600 then ends at step 670.

FIG. 7 is a flow chart of a read operation 700 which can be executed by the processor 114 to read data for a particular logical address.

In response to a read command to read data from the particular logical address, at step 710 the block which corresponds to the particular logical address is determined using the address translation table discussed above.

At step 720, the status flag areas of the sectors of the corresponding block are read to determine the active sector.

At step 730, the write-log area of the active sector is searched for an entry of the logical address, the entry indicating that the write-log area includes updated data for the logical address.

The write-log data in the example above was written to the first free location in the write-log area. As a result, the write-log data is arranged in a temporal sequence. Thus, in the illustrated embodiment the data in the write-log area is read beginning with the latest write-log data because, if the data for the logical address is updated a number of times, the first entry of the logical address that is found is the most recent and thus indicates the valid data for the logical address. Thus, upon finding an entry of the logical address, the operation continues to step 740 where the data for the logical address is read using the entry.

If an entry is not found in the write-log area, then the corresponding entry in the core data area contains the valid data for the particular logical address. At step 750, the corresponding entry in the core data area associated with the particular logical address is determined using the active sector offset provided by the address translation table discussed above. The data stored in the corresponding entry is then read and output.

As was discussed above, from time to time the sectors acting as the active and inactive sectors are switched.

Figure 8:
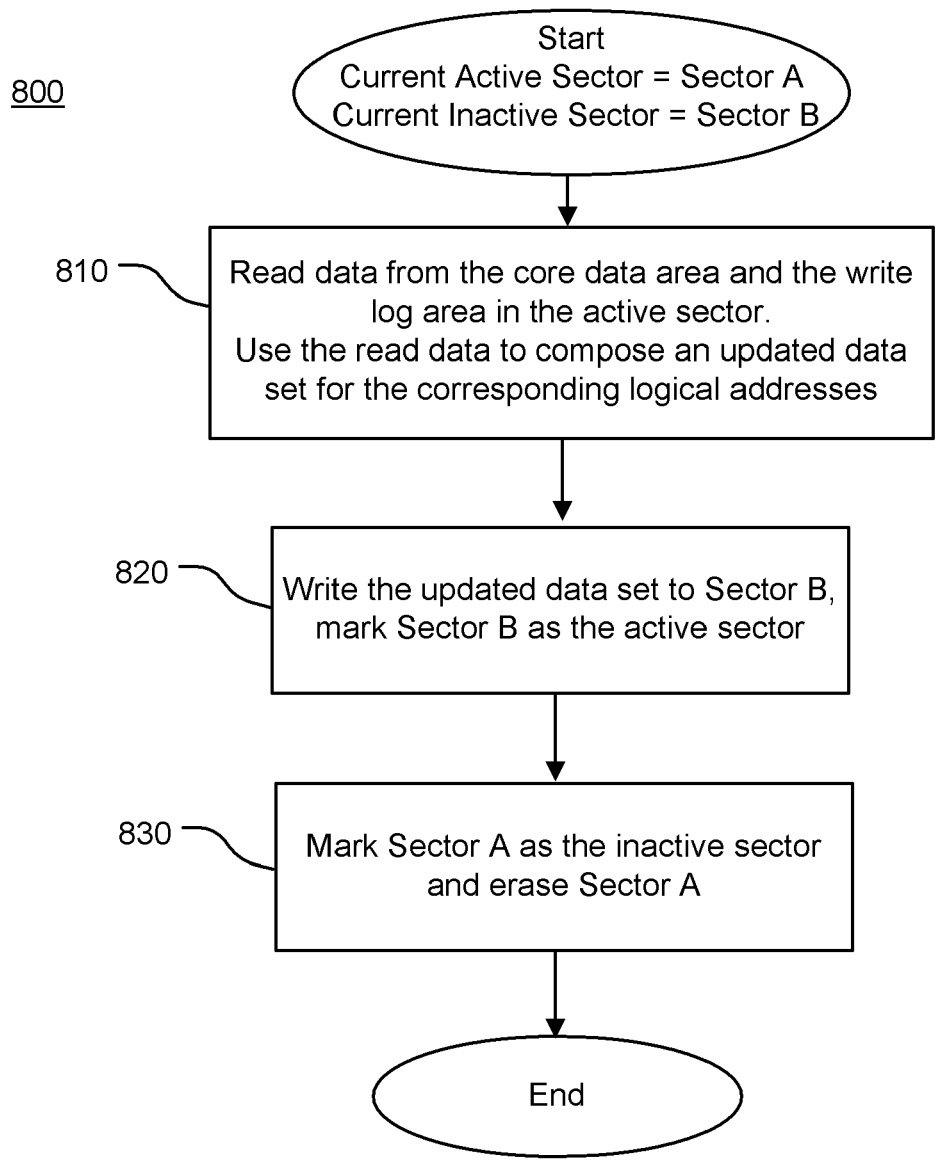
FIG. 8 illustrates a flow diagram of an operation for composing an updated data set.

FIG. 8 illustrates a flow diagram of a composing operation 800 which can be executed by the processor 114. The operation 800 may be initiated when the write-log area of the active sector is full, or at any other time.

For clarity purposes in the discussion below, the sector that is active before the operation 800 begins is referred to as "Sector A", while the inactive sector is referred to as "Sector B".

At step 810, the data stored in the write-log area and the core data area of the active sector before the operation 800, Sector A, is read. The updated data set containing the valid data for the corresponding logical addresses is composed using the data read from the core data area and the write-log area.

At step 820, the updated data set is written to the core data area of Sector B, and Sector B is marked as the active sector. In the illustrated embodiment, the data of the status flag area of Sector B is changed to temporary (0xFFFF00) prior to the updated data set being written, and following the writing of the updated data set the data in the status flag area of Sector B is then changed to active. Marking Sector B as active only after the updated data set is written ensures that Sector B includes the valid data. In addition, by changing the status flag area of Sector B in this manner, the data of the status flag area can be used to indicate whether an interruption such as power down occurred. This is discussed in more detail below with reference to FIG. 9.

At step 830, Sector A is marked as inactive and is erased. In the illustrated embodiment, the data of the status flag area of Sector A is changed to dirty (0x000000) prior to performing the erase operation on Sector A. The sector erase operation then changes the data of the status flag are of Sector A to erased (inactive). By marking Sector A as dirty prior to erasing it, the data of the status flag area can be used to indicate whether an interruption occurred prior to erasing Sector A.

As described above, the marking of the sectors is accomplished by changing data in the status flag areas of the sectors, without the need to always erase the status flag area.

Figure 9:
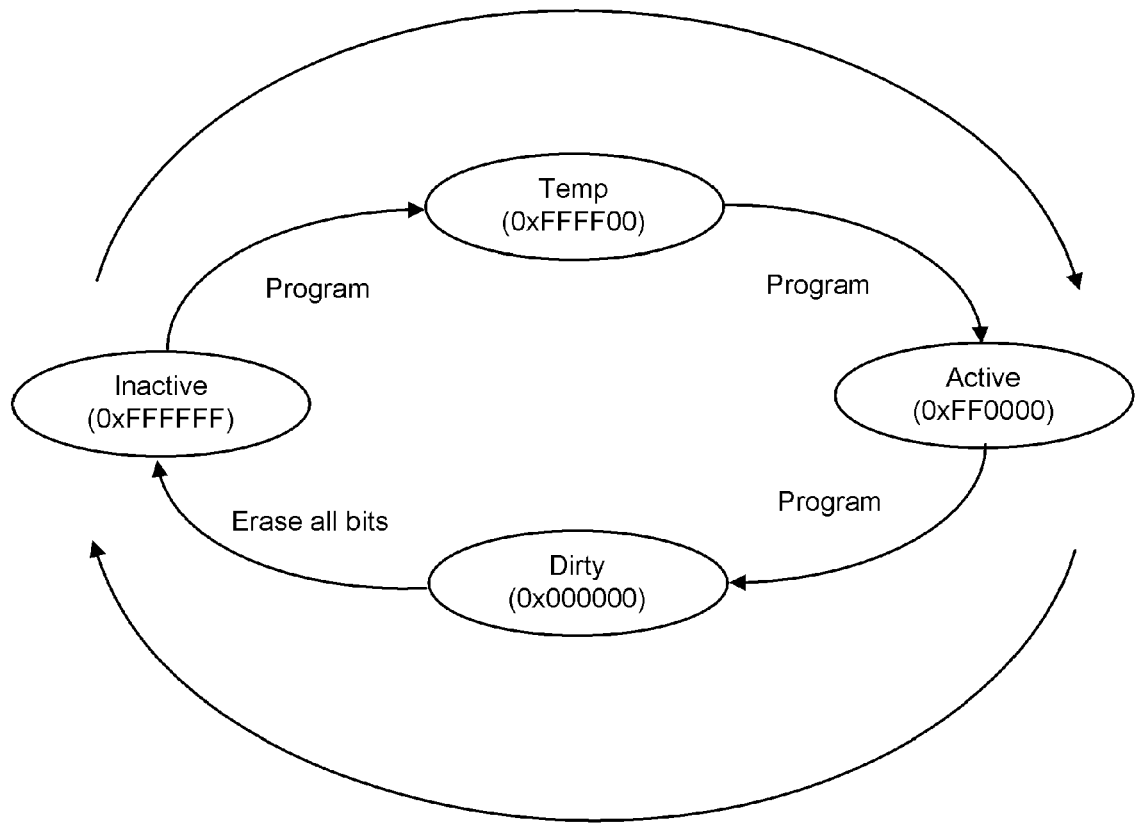
FIG. 9 is a transition diagram illustrating the change in the data value stored in the status flag area of a sector during operation.

FIG. 9 is a transition diagram illustrating the change in the data stored in the status flag area of a sector during operation. In FIG. 9 the status flag area is 3 bytes.

As shown in FIG. 9, when a sector is inactive the data in the status flag area is "0xFFFFFF". In the change from inactive to active, the status flag is first changed to temporary. In FIG. 9, the change to temporary status is done by programming the least significant byte so that the data of the status flag area is "0xFFFF00". The change from temporary to active is done by programming the middle byte, so that the data of the status flag area is "0xFF0000".

In the change from active to inactive, the data of the status flag area is first changed to dirty. In FIG. 9, the change to dirty is done by programming the most significant byte in the status flag area so that the data is "0x000000" (dirty). Since the status flag area is within the sector, the status flag area is erased back to "0xFFFFFF" when the sector is erased. This technique eliminates the need to erase the status flag area each time it needs to be changed. As a result, the data of the status flag area can be stored within the sector, rather than stored separately.

Alternatively, the change in the status of the various sectors can be done by programming data in the status flag area different from those illustrated in FIG. 9.

Figure 10:
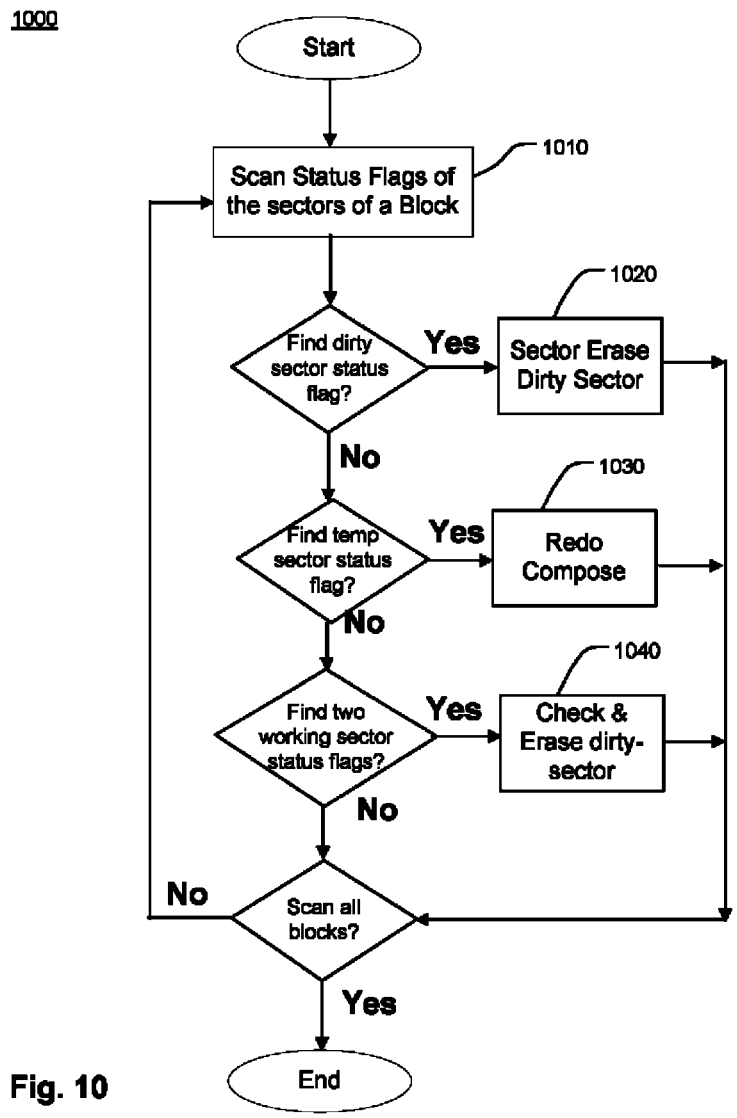
FIG. 10 is a flow diagram of an operation to determine if an interruption in the composing operation has occurred.

FIG. 10 is a flow diagram of an operation 1000 which can be executed by the processor 114 to determine if an interruption in the operation 800 of FIG. 8 has occurred. The operation 1000 may be carried out, for example, upon power on of the flash memory device 120 or before the first write command.

At step 1010, the status flag of the sectors of a particular block are read. If the status flag of a sector is dirty, then an interruption occurred during step 830 of the operation 800. In such a case, at step 1020 a sector erase is performed on the sector.

If the status flag of a sector indicates the sector is temporary, then an interruption occurred during step 820 of the operation 800. In such a case, at step 1030 the operation 800 is performed on the block.

If two sectors in the block have working sector status flags, then an interruption occurred sometime between during steps 820 and 830 of the operation 800. In such a case, at block 1040 the sectors are read to determine which sector is full and thus is actually the dirty sector, and a sector erase is then performed on the dirty sector.

The operation 1000 then continues to check the next block in the flash memory device 120, until all the blocks have been checked.

Figure 11:
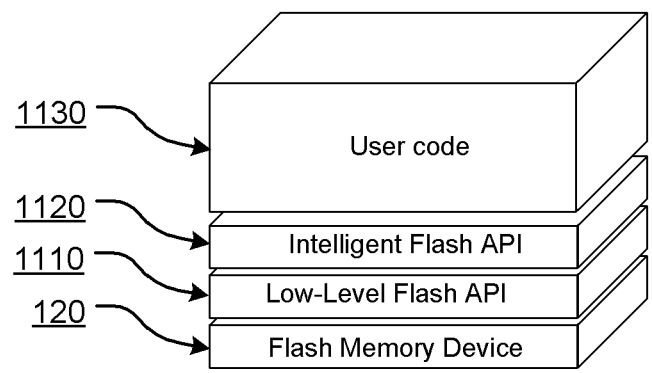
FIG. 11 illustrates an embodiment of the relationship between the different levels of software for the flash memory device.

FIG. 11 illustrates an embodiment of the relationship between the different levels of software for the flash memory device 120. The user code 1130 includes logic to provide the logical addresses and the commands to read and write data to the flash memory device 120.

The Intelligent Flash Application Programming Interface (API) 1120 is a software module including logic to perform the logical-to-physical address mapping and translation, and logic for the management of the data written to and read from the flash memory device 120 to carry out the various operations described herein. The Intelligent Flash API 1120 translates the commands from the user code 1130 and provides instructions to the low-level flash API 1110. The Intelligent Flash API 1120 also uses the address translation table to translate the logical addresses from the user code 1130 to corresponding physical addresses, which are then provided to the low-level flash API 1110 software module.

The low-level flash API 1110 is a software driver particularly adapted to function with the flash memory device 120. The low-level flash API 1110 includes logic to perform the actual reading and writing of data in the flash memory device 120 in response to the instructions and physical addresses provided by the Intelligent Flash API 1120.

The flash memory device 120, the low-level flash API 1110, and the Intelligent Flash API 1120 together emulate the programming and erasing of the flash memory device 120 on a byte-by-byte basis as described herein.

The flash memory device 120 and the low-level flash API 1110 can be implemented using a variety of commercially available off-the-shelf flash devices, such as the MX25L512 CMOS serial flash by Macronix International Corporation, Ltd. As a result, the Intelligent Flash API 1120 provides the ability emulate the programming and erasing of the flash memory device 120 on a byte-by-byte basis as described herein, without necessitating the re-writing of the low-level drivers used by such devices.

In FIG. 11 the Intelligent Flash API 1120 is arranged between the user code 1130 and the low-level flash API 1110.

Figure 12:
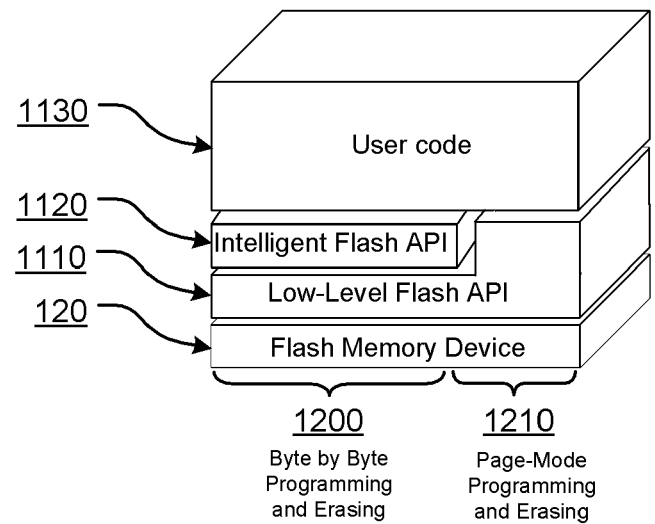
FIG. 12 illustrates a second embodiment of the relationship between the different levels of software for the flash memory device.

FIG. 12 illustrates a second embodiment of the relationship between the different levels of software for the flash memory device 120, in which the flash memory device includes a byte_write region 1200 and a page_write region 1210.

In FIG. 12 the Intelligent Flash API 1120 operates the byte_write region 1200 of the flash memory device 120 to emulate the programming and erasing on a byte-by-byte basis as described herein. In addition, the low-level flash API 1110 operates the page_write region 1210 to program and erase data on a block by block basis in the flash memory device 120.

In such an embodiment the flash memory device 120 can be used as both an EEPROM and a flash memory. As a result, the flash memory device 120 can be used to replace separate EEPROM and flash memory, which reduces the system cost and complexity.

The techniques described herein enable the use of block-based flash memory in a large number of information processing systems. As an example, the techniques described herein emulate programming and erasing of single bytes of data. More generally, the techniques described herein can be used to program and erase data of other sizes in block-based flash memory, where the size of the data to be programmed and erased is less than the size of the block.

Advantages of the techniques described herein include savings on system cost by allowing for the replacement of higher-priced lower-density EEPROM with block-based flash memory. By implementing the techniques described herein, the flash memory read/write endurance can be increased by greater than 1000× over traditional block-access algorithms.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A method for operating a memory device having a plurality of physical blocks, each block in the plurality of blocks comprising a plurality of sectors, the method comprising:

mapping groups of logical addresses of sectors of data to corresponding blocks in the plurality of physical blocks, and for a particular block in the plurality of physical blocks mapped to a particular group of logical addresses:

marking a first sector in the plurality of sectors of the particular block as an active sector having a core data area and a write-log area, and marking a second sector in the plurality of sectors of the particular block as an inactive sector;

writing a data set for the sector having the particular group of logical addresses to the core data area; and writing updated data for a part of the sector in response to a write command, said part of the sector having a logical address within the particular group of logical addresses including lower order address bits that identify the logical address of said part within the particular group, said writing updated data comprising writing write-log data to a free location in the write-log area, the write-log data including said lower order address bits and including said updated data.

2. The method of claim 1, wherein said part of the sector is a byte, and the lower order address bits identify the byte within the particular group of logical addresses.

3. The method of claim 1, further comprising:
from time to time composing an updated data set using data from the core data area and the write-log area;
writing said updated data set within a core data area of the second sector, and marking the second sector as the active sector; and
erasing the first sector, and marking the first sector as the inactive sector.

4. The method of claim 3, wherein:
the first and second sectors each include a status flag area;
said marking the second sector as the active sector comprises programming a predetermined data in the status flag area of the second sector; and
said marking the first sector as the inactive sector comprises erasing the status flag area of the first sector.

5. The method of claim 4, wherein said erasing the first sector erases the status flag area of the first sector.

6. The method of claim 3, wherein:
the first and second sectors each include a status flag area;
said marking the second sector as the active sector comprises:
programming a first predetermined data in the status flag area of the second sector to mark the second sector as a temporary sector prior to writing said updated data set; and
programming a second predetermined data in the status flag area of the second sector to mark the second sector as the active sector after writing said updated data set; and
said marking the first sector as the inactive sector comprises:
programming a third predetermined data in a status flag area of the first sector to mark the first sector as a dirty sector prior to erasing the first sector; and
erasing the first sector.

7. The method of claim 1, wherein said writing the updated data for the logical address comprises:
writing the write-log data to a free location in the write-log area unless the write-log area is full; and
composing the updated data set for the particular block if the write-log area is full.

8. The method of claim 1, further comprising reading data for a second logical address mapped to the particular block in response to a read command, said reading data comprising:
reading data for the second logical address from the write-log area if the write-log area includes an entry of the second logical address; and
reading data for the second logical address from a corresponding entry in the core data area if the write-log area does not include an entry of the second logical address.

9. The method of claim 8, wherein said reading data for the second logical address from the write-log area comprises:
identifying a most recent entry of the second logical address in the write-log area; and
reading the data for the second logical address using the most recent entry.

10. An apparatus comprising:
a data processor and memory coupled to the data processor, the memory storing instructions executable by the data processor including instructions for:
mapping groups of logical addresses of sectors of data to corresponding blocks in a plurality of physical blocks, each block in the plurality of blocks comprising a plurality of sectors, and for a particular block in the plurality of physical blocks mapped to a particular group of logical addresses:
marking a first sector in the plurality of sectors of the particular block as an active sector having a core data area and a write-log area, and marking a second sector in the plurality of sectors of the particular block as an inactive sector;
writing a data set for the sector having the particular group of logical addresses to the core data area; and
writing updated data for a part of the sector in response to a write command, said part of the sector having a logical address within the particular group of logical addresses including lower order address bits that identify the logical address of said part within the particular group, said writing updated data comprising writing write-log data to a free location in the write-log area, the write-log data including said lower order address bits and including said updated data.

11. The apparatus of claim 10, wherein said part of the sector is a byte, and the lower order address bits identify the byte within the particular group of logical addresses.

12. The apparatus of claim 10, further including instructions for:
from time to time composing an updated data set using data from the core data area and the write-log area;
writing said updated data set within a core data area of the second sector, and marking the second sector as the active sector; and
erasing the first sector, and marking the first sector as the inactive sector.

13. The apparatus of claim 12, wherein:
the first and second sectors each include a status flag area;
said instructions for marking the second sector as the active sector comprises instructions for programming a predetermined data in the status flag area of the second sector; and
said instructions for marking the first sector as the inactive sector comprises instructions for erasing the status flag area of the first sector.

14. The apparatus of claim 13, wherein said instructions for erasing the first sector comprises instructions for erasing the status flag area of the first sector.

15. The apparatus of claim 12, wherein:
the first and second sectors each include a status flag area;
said instructions for marking the second sector as the active sector comprises instructions for:
programming a first predetermined data in the status flag area of the second sector to mark the second sector as a temporary sector prior to writing said updated data set; and
programming a second predetermined data in the status flag area of the second sector to mark the second sector as the active sector after writing said updated data set; and
said instructions for marking the first sector as the inactive sector comprises instructions for:
programming a third predetermined data in a status flag area of the first sector to mark the first sector as a dirty sector prior to erasing the first sector; and
erasing the first sector.

16. The apparatus of claim 10, wherein said instructions for writing the updated data for the logical address comprises instructions for:

writing the write-log data to a free location in the write-log area unless the write-log area is full; and composing the updated data set for the particular block if the write-log area is full.

17. The apparatus of claim 10, further including instructions for reading data for a second logical address mapped to the particular block in response to a read command, said instructions for reading data comprising instructions for:

reading data for the second logical address from the write-log area if the write-log area includes an entry of the second logical address; and reading data for the second logical address from a corresponding entry in the core data area if the write-log area does not include an entry of the second logical address.

18. The apparatus of claim 17, wherein said instructions for reading data for the second logical address from the write-log area comprises instructions for:

identifying a most recent entry of the second logical address in the write-log area; and reading the data for the second logical address using the most recent entry.

* * * * *